US005889961A

United States Patent [19]
Dobbek

[11] Patent Number: 5,889,961
[45] Date of Patent: Mar. 30, 1999

[54] DISK DRIVE HAVING PROGRAM TO BE EXECUTED BY A SECOND PROCESSOR STORED IN A FIRST PROCESSOR'S ROM IN A COMPRESSED FORM

[75] Inventor: Jeffrey Joseph Dobbek, San Jose, Calif.

[73] Assignee: International Business Machines Corporation, Armonk, N.Y.

[21] Appl. No.: 672,212

[22] Filed: Jun. 27, 1996

[51] Int. Cl.[6] ................................................ G06F 13/00
[52] U.S. Cl. .................... 395/200.77; 395/888; 395/652
[58] Field of Search .................. 360/8, 78.14; 395/821

[56] References Cited

U.S. PATENT DOCUMENTS

| | | | |
|---|---|---|---|
| 4,386,416 | 5/1983 | Giltner et al. | 364/900 |
| 4,562,423 | 12/1985 | Humblet | 340/347 DD |
| 5,016,009 | 5/1991 | Whiting et al. | 341/67 |
| 5,237,460 | 8/1993 | Miller et al. | 360/8 |
| 5,589,998 | 12/1996 | Yu | 360/78.14 |

OTHER PUBLICATIONS

Anonymously, "Compressed IPL ROM", IBM Research Disclosure, N333, Jan. 1992.
B. L. Marks, "Trimming Of Huffman Coding Tables", IBM Technical Disclosure Bulletin, vol. 22, No. 5, Oct. 1979, p. 2106.
P. A. Cardenia, "Data Compression For E–Beam Tool", IBM Technical Disclosure Bulletin, vol. 23, No. 2, Jul. 1980, pp. 588–590.
S. Hori and K. Oka, "Decompression Process", IBM Technical Disclosure Bulletin, vol. 28, No. 5, Oct. 1985, pp. 1843–1844.
G. S. Cheema, G. P. Hill and K. J. Ramey, "Compression And Dynamic Decompression Of Executable Code", IBM Technical Disclosure Bulletin, vol. 33, No. 2, Jul. 1990, pp. 297–298.

*Primary Examiner*—Thomas C. Lee
*Assistant Examiner*—Anderson I. Chen
*Attorney, Agent, or Firm*—G. Marlin Knight

[57] ABSTRACT

A disk drive or comparable device is described which has two microprocessors connected by a communication link. One of the microprocessor accesses nonvolatile storage means containing object code in a compressed format for the other microprocessor. When the device is reset the microprocessor having access to the ROM decompresses the object code and transmits it to the second microprocessor. The compression scheme stores indexes into a table for the N most frequent words in the object code and leaves any excess words uncompressed. The uncompressed words are distinguished from the indexes by a set of flags which may be stored in-line with the compressed code or stored separately to avoid having to perform bit shifting to restore elements to byte boundaries.

15 Claims, 5 Drawing Sheets

FIGURE 4
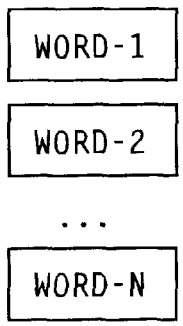
FIGURE 5
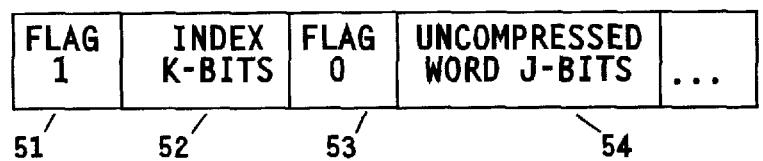
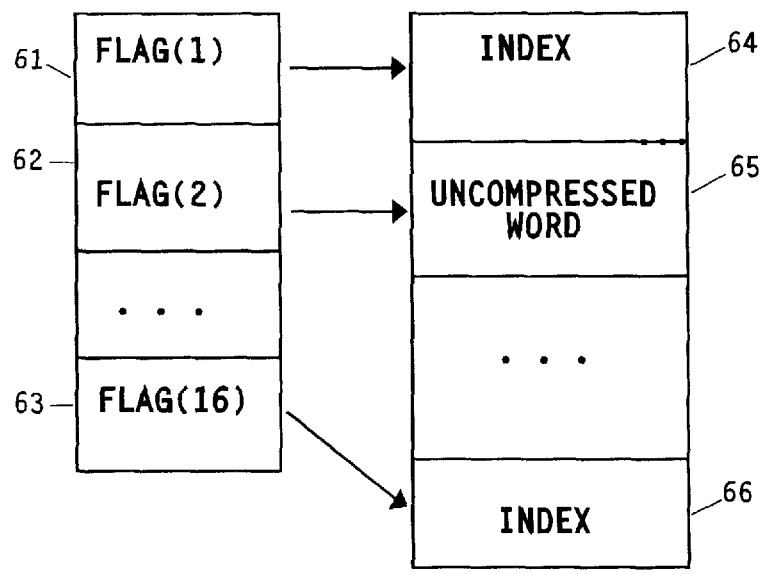
FIGURE 6 ing a small amount of code. The
DISK DRIVE HAVING PROGRAM TO BE EXECUTED BY A SECOND PROCESSOR STORED IN A FIRST PROCESSOR'S ROM IN A COMPRESSED FORM

FIELD OF THE INVENTION

The invention described herein relates to the functional architecture of data storage devices or similar devices which have at least two microprocessors and more particularly to the way that executable code and related data are stored in a multiprocessor system.

BACKGROUND OF THE INVENTION

A typical architecture for a storage device includes a microprocessor directly connected to a ROM containing the executable code for the microprocessor. The use of more than one microprocessor in a single data storage device is also known in the art. As the complexity of the devices increases, the size of the needed code increases. Larger ROMs for storing larger amounts of code are, of course, more expensive. One scheme that is employed to reduce ROM size is to store only enough code (i.e., bootstrap code) in the ROM to make the storage device capable of reading the final code load from the storage device itself; but, since this code by definition has to make the device operational, it can be quite large as well.

Compressing part of the code in a personal computer's ROM has been proposed. (See "Compressed IPL ROM," Research Disclosure, No. 333, January 1992, Disclosed anonymously.) This is accomplished by compressing the contents of the ROM and decompressing the ROM into RAM before using its contents. To reduce the amount of ROM required to support the various devices which are attached to the computer, data compression is applied to the text contained in the ROM. A small decompression program also resides in the ROM. The decompression program expands the compressed ROM text into RAM. The majority of the power-on diagnostics and all of the initial program load function are then executed out of RAM.

G. S. Cheema, et al. teach that executable code can be loaded into memory in a compression format and dynamically decompressed to reduce the storage requirements of executable code. (See "Compression And Dynamic Decompression Of Executable Code", IBM Technical Disclosure Bulletin, No. 2, July 1990, pp. 297–298.) The process compresses an overlay library file such that each separate overlay can still be extracted from the file, when needed, without having to decompress the entire overlay library file.

Numerous compression schemes have been developed which can be applied to compress code with varying levels of efficiency and complexity. Huffman codes, which are variable length, have been widely used. B. L. Marks describes dividing characters into two groups based on frequency. The most frequent characters (A group) are encoded using Huffman coding. An additional Huffman code is allocated as a marker, or escape code, which tells the system that an uncompressed character follows. Thus, set B characters are prefixed with the Huffman "copy" character but are not encoded. (See "Trimming Of Huffman Coding Tables", IBM Technical Disclosure Bulletin, October 1979, p. 2106.)

It is well known in the disk drive art to use two microprocessors, with one handling front-end tasks such as interfacing with the host system and the other handling back-end tasks such as servo control. It is also known that code and data for one microprocessor in a disk drive can be stored in ROM which is accessible only by the other microprocessor which transmits the code and data to the first microprocessor for execution. It is also known that one or more registers (e.g., data, address and command registers) may be used to communicate the code from one microprocessor to the other.

SUMMARY OF THE INVENTION

The invention is a apparatus and corresponding method for use in a disk drive or comparable device which has two microprocessors, each having an independent RAM which is used for real time access to object code and/or data, a communication link between the microprocessors, and at least one nonvolatile storage means for storing object code and data which for simplicity will be called a ROM. When the device is first powered up or goes through a reset sequence, the one of the microprocessors having access to the ROM reads a previously compressed set of object code and data which is then decompressed and transmitted to the second microprocessor.

Because there is a premium on ROM space in disk drives, it is important to choose a simple decompression algorithm which can be implemented in a small amount of code. The preferred embodiment uses a compression algorithm which builds a table from the N most frequent binary words in the object code and data to be compressed such that the number of bits (b) required to address N table entries is less than the number of bits in the original words. The words are then stored in compressed form in the ROM by replacing each word with an index into the table. For example, if words are 16 bits and N=256, the index of any element in the table requires 8 bits. The 8-bit table indexes are stored in place of the original 16-bit words. If the number of unique words in the code and data to be compressed are less than N, then each word can be replaced by the index into the table and subsequently decoded accordingly. If the number of unique words is greater than N, then the words which are not included in the most frequent N words are stored without compression. In this case, it is necessary to distinguish between compressed and uncompressed characters in the ROM. This can be done by prefixing each character stored in the ROM with a 1-bit flag which distinguishes the compressed characters from the uncompressed characters. The decoding process uses the table created during the compression and replaces the table indexes with the original word. If flags are being used, they will distinguish table indexes from uncompressed data. The flags may be stored in-line with the data or may be stored separately.

BRIEF DESCRIPTION OF THE DRAWINGS

FIG. 4 illustrates a table of N words which may be used for decompression in the invention.

FIG. 5 illustrates the format of compressed code used in the invention which has uncompressed words and flags stored in-line with indexes.

FIG. 6 illustrates the format of compressed code used in the invention which has indexes and uncompressed words with the flags stored separately.

DETAILED DESCRIPTION OF THE INVENTION

Figure 1:
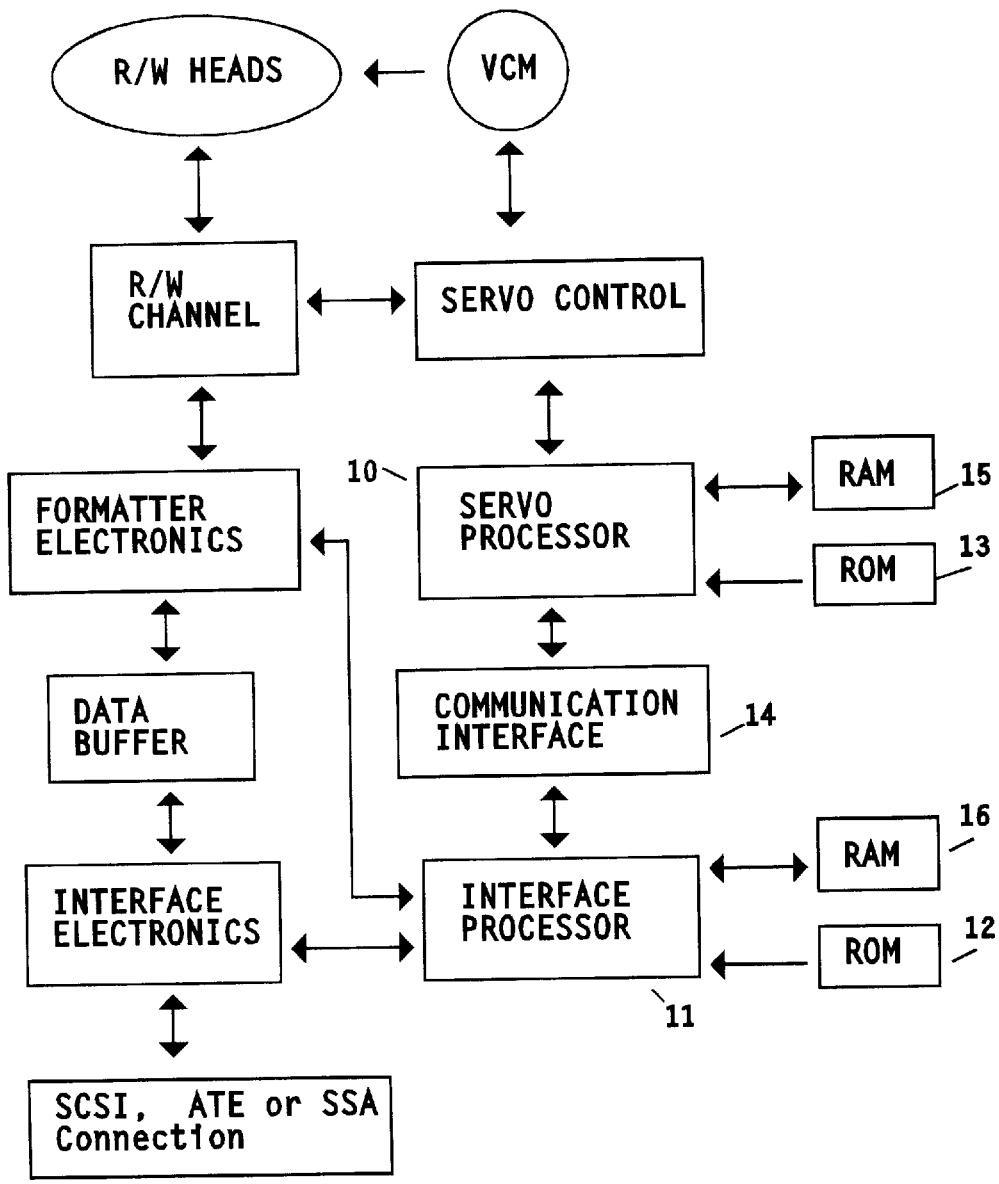
FIG. 1 illustrates a block diagram of a data storage device of the type wherein the invention can be practiced.

The invention can be used in a variety of devices using a variety of microprocessors, but the detailed embodiment of the invention will be described for a disk drive having a first microprocessor which handles the host interface and a second microprocessor which handles the required servo operations. FIG. 1 is a block diagram of a disk drive of a type in which the invention can be practiced. The servo microprocessor (SM) 10 for described embodiment is a commercially available Texas Instrument TMS320C2Xlp and the code examples used below are for it. In the embodiment described, it is the code and data (hereinafter referred to generically as code) for the SM that is stored in compressed form and downloaded. The invention could be applied equally well to compressed interface microprocessor code or code for any other processor or processors. The invention could also be applied to compress and download code to multiple microprocessors from a single primary microprocessor. The interface microprocessor (IM) 11 has access to the compressed code and data for the SM stored in a ROM 12. The IM is able to execute the code for the decompression and communication functions from its own nonvolatile or volatile RAM 16 which may be the same as that used to store the compressed code for downloading to the SM. The SM must have at least a small ROM 13 for storing sufficient code to initialize its associated hardware and to download the code from the IM into a RAM for execution. Any method of reliably communicating the code to the SM can be used. One way to do it is to connect the IM to the SM by means of one or more registers (e.g., data, address and command registers 14) to which the IM writes and from which the SM reads. In the described detailed embodiment, a 16-bit register with protocol interlocking is used. The IM writes a 16-bit word to the register and waits for the SM to read it out before writing the next word. The SM may simply load the code sequentially into its RAM; or, alternatively, there may be an additional address register which is used to specify the address where the code word in the data register is to be stored. There may also be a command register which allows the IM to direct the SM perform functions related to the downloading process. There must be some way for the IM to signal the SM that the download is complete. A flag may be placed in the data register, the address register and/or the command register to mark the end of the code. The SP then begins execution of the downloaded code in its RAM.

The code may be decompressed before or after downloading; therefore, the decompression program may reside in either the IM or the SM as desired. Only one of the processors needs to have the decompression program, however. Performing the decompression after downloading the code would reduce download time, but would increase the required ROM size for the SM.

The download process starts after the SM is reset, which causes it to execute the program in its ROM. After performing the required initializations, the SM will monitor the registers used for communicating with the IM and will begin storing the 16-bit words placed in the register by the IM into its RAM 15. Some sort of error checking should preferably be performed on the downloaded code by the SM, such as verification by the well known use of a checksum or other suitable technique. The error checking process can provide a check on the compression process as well as the communication process if the checksum is generated precompression and checked post decompression.

Figure 2:
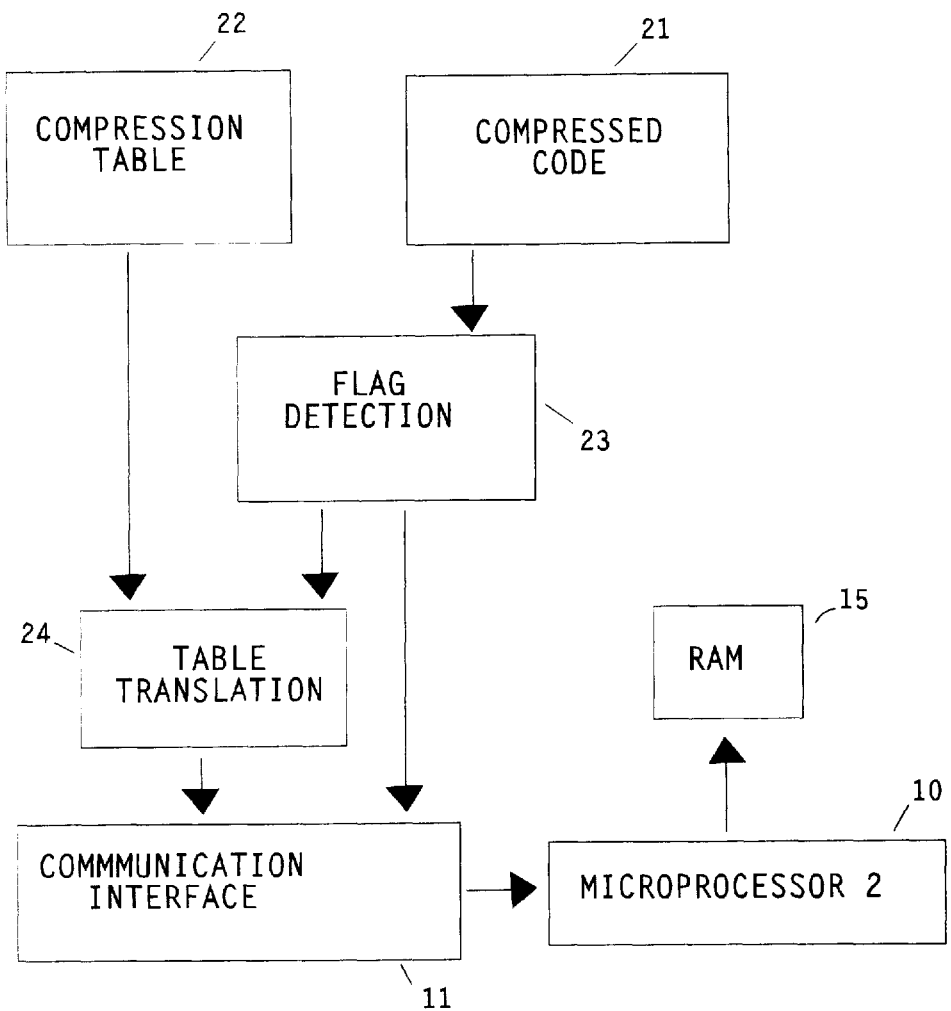
FIG. 2 illustrates a block diagram of an embodiment of the invention.

The following makes reference to FIG. 2. The compression of the code is preferably performed during the development of the microcode which is stored in the ROM for the drive. The compressed code 21 along with the compression table 22 are stored in the ROM. The tools which perform the compression need not be stored in the drive. The program in the drive needs only to be able to decompress the code. The translation function 24 uses the previously created compression table to decompress the code. The particular compression algorithm chosen requires that a number N be chosen, which is the maximum number of the unique words which will be compressed. The compression table will then contain N entries of equal length words (j-bits each). (See FIG. 4.) FIG. 5 shows a fragment of compressed code. A flag bit equal to one 51 is followed by the k-bit index into the table 52. A flag bit equal to zero 53 is followed by the j-bit uncompressed word 54. In the described embodiment of the invention, the words are 16 bits (thus j=16) and N is 256; therefore, the table consists of 256 words of 16 bits each. When N equals 256, eight bits are needed for the table indexes (thus, k=8). If there are no more than 256 unique words in the code to be compressed, then every word will be entered into the table. In general, if there are more than N unique words in the code, there must be a way to handle words which are not compressed using the table. A simple way to do that is to not compress words below N in frequency and then distinguish them using a flag. Since the microprocessor code being described has more than 256 unique words, a 1-bit flag is used to distinguish the table index from the uncompressed or raw words. Thus, the 1-bit flag and the 8-bit table index require 9 bits for each of the 256 most frequent words. A flag bit is also added to each uncompressed word, making it 17 bits. The compression is achieved by storing the 256 most used 16-bit words as 9 bits. The compression is enhanced by the fact that object code instructions for microprocessors (including the TMS320) tend not to be randomly distributed. A simple way to look at it is that there tends to be many branches, clear accumulator, call, return, push, pop . . . , etc. instructions. The compression/decompression method also generates overhead such as decompression code, extra tables and pointers. To be effective, the overhead must be small compared with the space gains.

Figure 3:
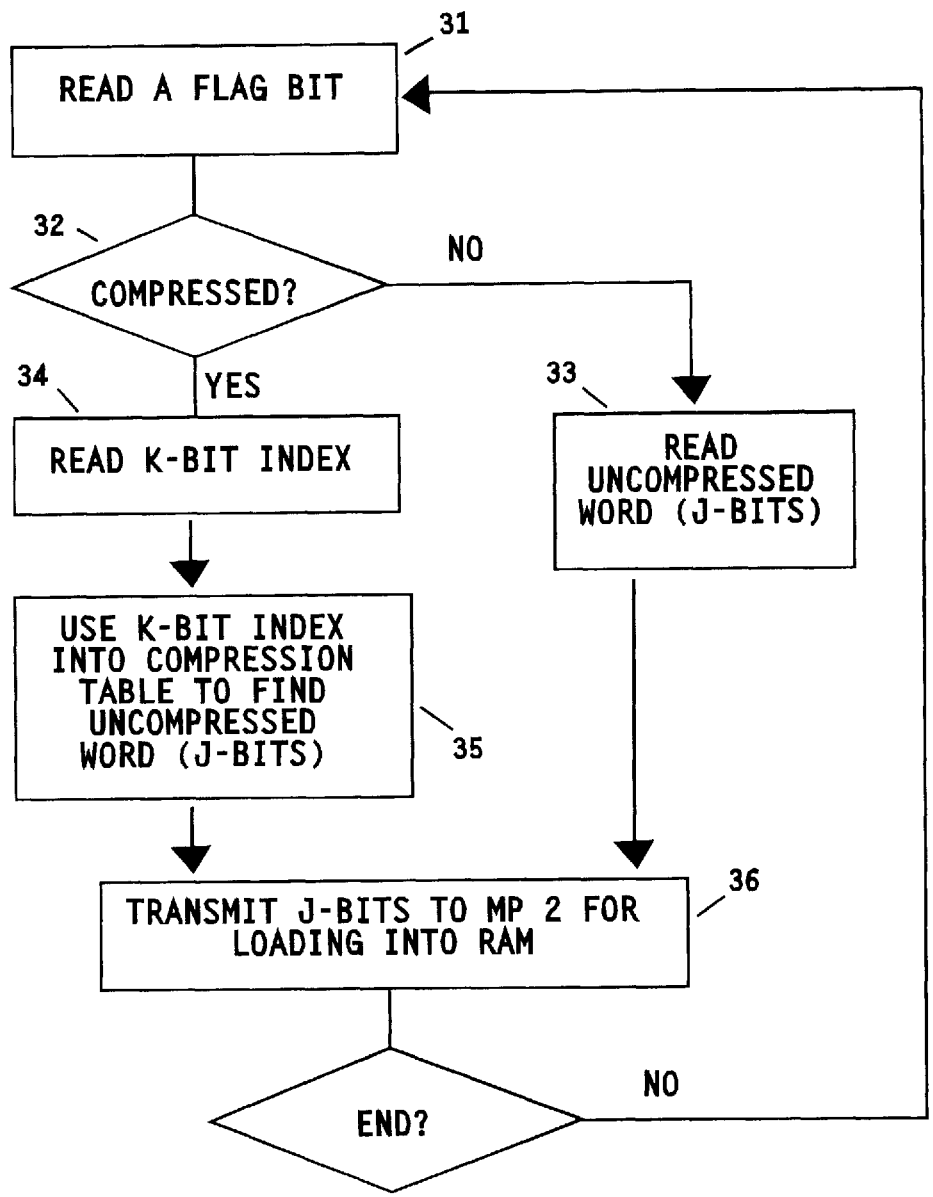
FIG. 3 is a flow chart of an embodiment of the method of the invention.

The flags may be stored in-line with the indexes and raw words, as is illustrated in FIG. 5. Flag bit 51 is followed by an index of k-bits 52, which is followed by another flag bit 53, which is followed by an uncompressed (raw) word of j-bits 54. Only a fragment of the code stored in the ROM is shown; and, in practice, the stream could extend to thousands of the units as described. The SM decompresses the code stored, as shown in FIG. 5, by processing it in units of k-bits (e.g., 9 bits) or j-bits (e.g., 17 bits). Reference will be made to FIG. 3 to describe the method of decompressing the code. The first bit in each unit is the flag bit. The flag bit is read first 31. The two possible states of the bit are used to distinguish the two groups 32. If the flag bit equals 1, then the following 8 bits are used as an index into the table 34. The word at the index in the table is read as the original 16-bit word 35, which can now be downloaded 36. If the flag bit equals 0, then the following 16 bits are the original 16-bit word is read 33 and can be downloaded without further processing 36. As the code is decompressed, it may be stored temporarily in RAM or it may be transmitted immediately to the SM.

It is also possible and sometimes preferable to store the flags separately from the other components. When the flags are stored in-line, the boundaries of the indexes may not line up with byte or word boundaries used by the microprocessors. using the resulting 9-bit and 17-bit units described above, the boundaries will clearly not correspond to any power of 2 boundaries. The result is a significant amount of overhead from shifting bits around to make the boundaries correct for use of the index and for storage of the raw words.

This overhead is reduced if the flags are stored separately. FIG. 6 illustrates that flags can be stored together as 16-bit words and mapped onto the indexes and raw words which are stored separately. The first flag bit 61 maps to the first element in stream of data, which in this example is an index 64. The second flag bit 62 maps to the second element in stream of data, which in this example is an uncompressed word 65. Similarly, the sixteenth flag bit 63 maps to the sixteenth element in stream of data, which in this example is an index 66. Since the indexes and the raw words are of different length, the position of the sixteenth element is not a fixed offset from the beginning of the compressed stream and will vary based on how many indexes versus raw words are contained in the prior fifteen elements.

Figure 7:
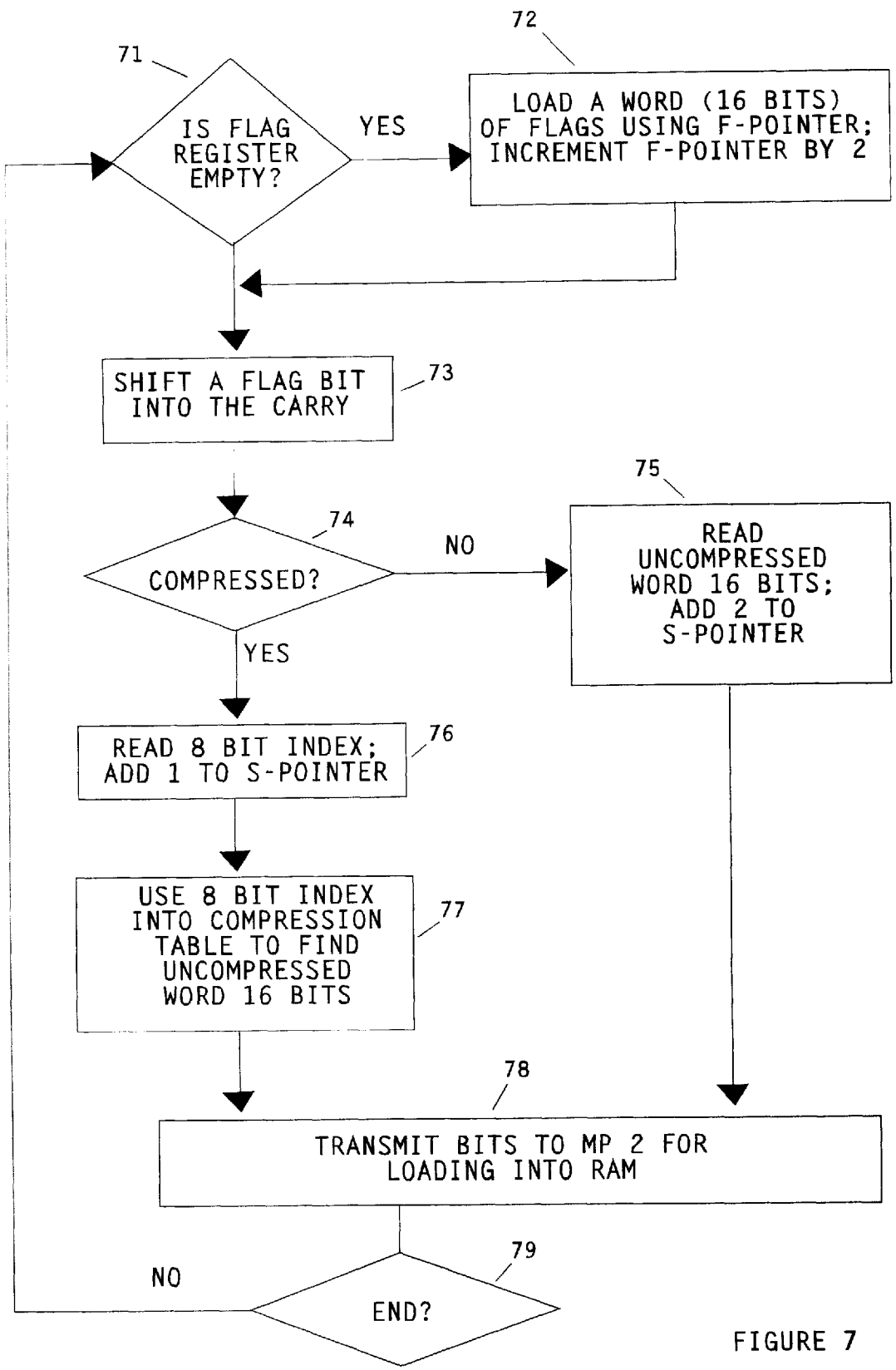
FIG. 7 is a flow chart of an embodiment of the method of the invention for processing indexes and uncompressed words with the flags stored separately.

FIG. 7 is a flow chart illustrating the processing of the compressed data when the flags are stored separately. The system can use one pointer (F-pointer) for reading the flags and another pointer (S-pointer) for reading the stream of indexes and raw words. The flags will then be read in groups of 8 or 16 bits, for example. At the start of the processing loop, the register used to hold the flags is empty 71 and is, therefore, loaded with the first 16-bit word of flags 72. The register is considered "empty" after these 16 bits have been used. Since the flags have been removed for separate storage, the indexes and raw words will be read on 8-bit or 16-bit boundaries. The flags are being read ahead of the other data and must be used one at a time as they correspond to the indexes and raw words. A convenient way to do this on most microprocessors is to use a shift or rotate instruction which sets the microprocessor's status flags (such as the carry flag) to test each bit as needed 73. The state of the carry flag can then be used to determine whether to branch 74 for processing of an uncompressed word 75 or to continue processing an index 76. When the flag indicates that the next element to be processed is an uncompressed word, the S-pointer is used to read a 16-bit word which is then read to be transmitted 78. When a 16-bit uncompressed word is read, the S-pointer which is typically in byte units has to be incremented by two 75. When the flag indicates that the next element is an index, the S-pointer is used to read the 8-bit index and is then incremented by one 76. The index is then used to retrieve the original uncompressed word from the table 77. Sixteen flag bits are used before another word of flags is loaded. After each set of bits is transmitted, the end condition is tested and processing continues until all of the code has been transmitted 79.

The separation of the parts of the compressed code could also be extended so that the indexes are stored separately from the raw words. In this case, separate pointers could be used to point into the stream indexes versus the stream of raw words.

The first step in compressing the code is to find the 256 most frequent words in the code to be compressed. Any convenient method for determining the frequency may be used, but one way is to clear a histogram which has a size of 2 raised to the power of the instruction width. In this case, it is 16 bits, which means that there are 65536 possible words. The code is scanned and a count is incremented corresponding to each unique word in the code. The zero count entries are removed or ignored, i.e., the histogram is squeezed. See Table 1, which is a small section of the squeezed histogram. The histogram is sorted in count order, i.e., highest occurrence first. The first 256 entries in the histogram are the most frequent words and become the table entries. This table is stored with the compressed code obtained in the following step.

The output of the compression process is as follows. The table is searched for each word of the raw code. If the word is in the table, then the output is the flag bit set to 1 and the 8-bit address of the word in the table. If the word is not in the table, then the output is the flag bit set to 0 and the raw code word, i.e., the original code word. In the described embodiment, the amount of space required for the compressed output then is 9 bits for each 16-bit word in the table and 17 bits for every word not in the table plus 256 entries in the table (512 bytes). The actual degree of compression will vary with the embodiment of the invention; but, if one assumes that 66% of the code words are in the table, then a code load with 8 k 16-bit words contain:

| | |
|---|---|
| 512 bytes + | (for table) |
| .66 * 8k bytes, + | (words in table) |
| (.33 * 8k) * 2 bytes + | (words not in table) |
| 8k/8 bytes = | (bit flag overhead) |
| 12.4k bytes | which is a savings of 3.6k |

The compressed output, the flags and the table are then stored in the ROM for the SM along with the executable code for the IM which decompresses this code and downloads it to the SM.

While the invention has been described with respect to a particular embodiment, it will be clear to one skilled in the art that variations are possible which are equivalent in purpose and function to those described and, therefore, do not deviate from the scope or spirit of the invention.

TABLE 1

Squeezed Histogram

Columns:  (1) Entry
          (2) Value
          (3) Count
          (4) Representation of Count

| (1) | (2) | (3) | (4) |
|---|---|---|---|
| 0 | 0 | 6F | ********************* |
| 1 | 1 | 6A | ******************** |
| 2 | 2 | 24 | ******** |
| 3 | 3 | 1F | ******* |
| 4 | C0C | 1D | ****** |
| 5 | 1005 | 42 | ************** |

TABLE 1-continued

Squeezed Histogram

Columns: (1) Entry
(2) Value
(3) Count
(4) Representation of Count

| (1) | (2) | (3) | (4) |
|---|---|---|---|
| 6 | 1006 | 27 | ******** |
| 7 | 1007 | 2C | ********* |
| 8 | 100C | 2A | ********* |
| 9 | 106D | 27 | ******** |
| A | 107C | 14 | ***** |
| B | 107E | 22 | ******* |
| C | 2011 | 17 | ***** |
| D | 2415 | 13 | **** |
| E | 2AE8 | 15 | ***** |
| F | 320E | 29 | ********* |
| 10 | 3219 | 19 | ****** |
| 11 | 547E | 19 | ****** |
| 12 | 617E | 10 | **** |
| 13 | 737E | 11 | **** |
| 14 | 7980 | 120 | ************************************************ |
| 15 | 7A80 | 8D | *************************** |
| 16 | 7FFF | 13 | **** |
| 17 | 8B88 | 10 | **** |
| 18 | 9004 | 10 | **** |
| 19 | 9005 | 37 | ************ |
| 1A | 9006 | 25 | ******** |
| 1B | 9007 | 2A | ********* |
| 1C | 900A | 10 | **** |
| 1D | 900C | 2B | ********* |
| 1E | 9067 | 21 | ******* |
| 1F | 906B | 1D | ****** |
| 20 | 906D | 2B | ********* |
| 21 | 9074 | 2E | ********** |
| 22 | 9077 | 14 | ***** |
| 23 | 907C | 2A | ********* |
| 24 | 907E | 43 | ************** |
| 25 | 907F | 1C | ****** |
| 26 | 987E | 32 | *********** |
| 27 | 987F | 10 | **** |
| 28 | B801 | 2C | ********* |
| 29 | B900 | 3A | ************ |
| 2A | B901 | 11 | **** |
| 2B | BA01 | 40 | ************* |
| 2C | BA03 | 18 | ***** |
| 2D | BC04 | 111 | ********************************************** |
| 2E | BC05 | D8 | ******************************************* |

TABLE 2

Sorted Histogram
Entry, Value, Accumulated Count, Count

Columns: (1) Entry
(2) Value
(3) Accumulated Count
(4) Count
(5) Representation of Count

| (1) | (2) | (3) | (4) | (5) |
|---|---|---|---|---|
| 0 | 7980 | 120 | 120 | ************************************************ |
| 1 | BC04 | 231 | 111 | ********************************************** |
| 2 | BF80 | 31F | EE | ***************************************** |
| 3 | BC05 | 3F7 | D8 | ************************************** |
| 4 | BFB0 | 4A4 | AD | ****************************** |
| 5 | 7A80 | 531 | 8D | ************************ |
| 6 | 0 | 5A0 | 6F | ******************* |
| 7 | 1 | 60A | 6A | ****************** |
| 8 | BC07 | 671 | 67 | ***************** |
| 9 | E100 | 6D1 | 60 | **************** |
| A | E200 | 72E | 5D | *************** |
| B | BC06 | 784 | 56 | *************** |

TABLE 2-continued

Sorted Histogram
Entry, Value, Accumulated Count, Count

Columns: (1) Entry
         (2) Value
         (3) Accumulated Count
         (4) Count
         (5) Representation of Count

| (1) | (2) | (3) | (4) | (5) |
|-----|-----|-----|-----|-----|
| C | E388 | 7D8 | 54 | *************** |
| D | 907E | 81B | 43 | ************ |
| E | 1005 | 85D | 42 | ************ |
| F | BA01 | 89D | 40 | *********** |
| 10 | B900 | 8D7 | 3A | ********** |
| 11 | 9005 | 90E | 37 | ********** |
| 12 | E344 | 944 | 36 | ********** |
| 13 | BE03 | 979 | 35 | ********* |
| 14 | EF00 | 9AE | 35 | ********* |
| 15 | E308 | 9E2 | 34 | ********* |
| 16 | 987E | A14 | 32 | ********* |
| 17 | E304 | A44 | 30 | ********* |
| 18 | 9074 | A72 | 2E | ******** |
| 19 | 1007 | A9E | 2C | ******** |
| 1A | B801 | ACA | 2C | ******** |
| 1B | 900C | AF5 | 2B | ******** |
| 1C | 906D | B20 | 2B | ******** |
| 1D | 100C | B4A | 2A | ******** |
| 1E | 9007 | B74 | 2A | ******** |
| 1F | 907C | B9E | 2A | ******** |
| 20 | 320E | BC7 | 29 | ******* |
| 21 | E38C | BEF | 28 | ******* |
| 22 | 1006 | C16 | 27 | ******* |
| 23 | 106D | C3D | 27 | ******* |
| 24 | BFC0 | C63 | 26 | ******* |
| 25 | 9006 | C88 | 25 | ******* |
| 26 | E3CC | CAD | 25 | ******* |
| 27 | 2 | CD1 | 24 | ******* |
| 28 | BE00 | CF4 | 23 | ****** |
| 29 | 107E | D16 | 22 | ****** |
| 2A | BFA0 | D38 | 22 | ****** |
| 2B | 9067 | D59 | 21 | ****** |
| 2C | 3 | D78 | 1F | ****** |
| 2D | C0C | D95 | 1D | ***** |
| 2E | 906B | DB2 | 1D | ***** |
| 2F | 907F | DCE | 1C | ***** |
| 30 | BE04 | DEA | 1C | ***** |
| 31 | BF00 | E04 | 1A | ***** |
| 32 | 3219 | E1D | 19 | ***** |
| 33 | 547E | E36 | 19 | ***** |
| 34 | BA03 | E4E | 18 | ***** |
| 35 | 2011 | E65 | 17 | **** |
| 36 | 2AE8 | E7A | 15 | **** |
| 37 | 107C | E8E | 14 | **** |
| 38 | 9077 | EA2 | 14 | **** |
| 39 | EE66 | EB6 | 14 | **** |
| 3A | 2415 | EC9 | 13 | **** |
| 3B | 7FFF | EDC | 13 | **** |
| 3C | BF01 | EEE | 12 | **** |
| 3D | 737E | EFF | 11 | *** |
| 3E | B901 | F10 | 11 | *** |
| 3F | 617E | F20 | 10 | *** |
| 40 | 8B88 | F30 | 10 | *** |
| 41 | 9004 | F40 | 10 | *** |
| 42 | 900A | F50 | 10 | *** |
| 43 | 987F | F60 | 10 | *** |
| 44 | 800 | F6F | F | *** |
| 45 | 23F2 | F7E | F | *** |
| 46 | 7380 | F8D | F | *** |
| 47 | 9 | F9B | E | *** |
| 48 | 8D7E | FA9 | E | *** |
| 49 | BF08 | FB7 | E | *** |
| 4A | 106B | FC4 | D | *** |
| 4B | 9076 | FD1 | D | *** |
| 4C | BF90 | FDE | D | *** |
| 4D | BFC3 | FEB | D | *** |
| 4E | BFCB | FF8 | D | *** |

What is claimed is:

1. A disk drive having at least first and second microprocessors comprising:
   a. a ROM readable by the first microprocessor containing a plurality of bits of previously stored information at least a portion of which is in a compressed form;
   b. decompression means for selectively decompressing groups of bits stored in the ROM;
   c. communication means between first and second microprocessors allowing information bits to be passed from the first to the second microprocessor;
   d. download means for reading predetermined bits from the ROM, processing these bits through the decompression means, and passing the bits output by the decompression means from the first to the second microprocessor using the communication means; and
   e. means for loading bits passed through the communication means into a RAM coupled to the second microprocessor and executing the bits in the RAM as a program for the second microprocessor.

2. The disk drive of claim 1 wherein the decompression means further comprises:
   means for accessing a table of N words which have been stored in the ROM in compressed form by storing an index into the table where the word appears in the ROM; and
   means for translating an index into the table into a word.

3. The disk drive of claim 2 wherein the decompression means further comprises:
   means for distinguishing an index from an uncompressed word using a flag bit; and
   means responsive to the flag bit for outputting an uncompressed word without processing by the means for translating.

4. The disk drive of claim 3 wherein the decompression means further comprises:
   means for reading flag bits from a location in the ROM other than a location which is adjacent to an index or an uncompressed word;
   whereby the flag bits can be stored separately from index or an uncompressed word.

5. A disk drive having at least first and second microprocessors comprising:
   a ROM, readable by the first microprocessor, containing code usable by the second microprocessor, at least a portion of the code being in a compressed form;
   communication means between first and second microprocessors allowing code to be passed from the first to the second microprocessor;
   download means for reading the code from the ROM and passing the code from the first to the second microprocessor using the communication means; and
   means for decompressing the code received by the second microprocessor and executing the code as a program for the second microprocessor.

6. The disk drive of claim 5 wherein the means for decompressing further comprises:
   means for accessing a table of N words used to compress the code in the ROM by storing an index into the table in the ROM in place of the word; and
   means for translating an index into the table into a word.

7. The disk drive of claim 6 wherein the means for decompressing further comprises:
   means for distinguishing an index from an uncompressed word using a flag bit; and
   means responsive to the flag bit for outputting an uncompressed word without processing by the means for translating.

8. A disk drive having at least first and second microprocessors comprising:
   a. a ROM readable by the first microprocessor containing operating code for the second microprocessor, at least a portion of the operating code being in a compressed form and a table of N words which have been stored in the ROM in compressed form by storing an index into the table in place of the word;
   b. decompression means for converting the operating code into an uncompressed form by translating each index into the table into a word;
   c. communication means between first and second microprocessors for passing the uncompressed form to the second microprocessors;
   d. means for loading the uncompressed form passed through the communication means into a RAM coupled to the second microprocessor; and
   e. means for executing the uncompressed form as a program for the second microprocessor.

9. The disk drive of claim 8 wherein the first microprocessor performs interface functions and the second microprocessor performs servo functions.

10. The disk drive of claim 8 wherein the communication means includes a register which is writable by the first microprocessor and readable by the second microprocessor.

11. The disk drive of claim 8 wherein the decompression means further comprises:
    means for distinguishing an index from an uncompressed word using a flag bit, the flag bit having a first and second state; and
    means responsive to a first state of the flag bit for outputting an uncompressed word without translating.

12. The disk drive of claim 8 wherein the operating code is stored as a plurality of indexes, uncompressed words and flag bits stored in the ROM, and a group of flag bits being stored at a single memory address the decompression means further comprising:
    means for reading a group of b flag bits (b>1) into a register in a single operation, the flag bits having a first and second state;
    means for sequentially using each of the b flag bits in the register to distinguish an index from an uncompressed word; and
    means responsive to a first state of the flag bit for bypassing the means for decompressing whereby an uncompressed word is passed directly to the communication means.

13. A method for operating a a disk drive having at least first and second microprocessors comprising:
    reading a unit of data from a ROM;
    decompressing the unit by retrieving an uncompressed word stored in a table of words stored in the ROM using the unit as an index;
    transmitting the uncompressed word to the second microprocessor;
    storing the uncompressed word into a RAM coupled to the second microprocessor; and
    executing the uncompressed word as a program instruction on the second microprocessor.

14. The method of claim 13 wherein a plurality of indexes, uncompressed words and flags are stored in the ROM as a program for the second microprocessor, further comprising:

reading a flag corresponding to a unit of data, the flag having a first and second state;

bypassing the decompressing step for the unit when the flag is in the first state and using the unit as the uncompressed word.

15. The method of claim 14 wherein a flag is one bit, further comprising:

loading a plurality of flag bits corresponding to a plurality of units into a register;

shifting each flag out of the register when a flag bit is needed to process a unit until the flag bits in the register have all been used, then repeating the loading step.

\* \* \* \* \*